US010823972B2

(12) United States Patent
Ma et al.

(10) Patent No.: US 10,823,972 B2
(45) Date of Patent: Nov. 3, 2020

(54) ROTATING MECHANISM AND HEAD-MOUNTED DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhanshan Ma, Beijing (CN); Hao Zhang, Beijing (CN); Wenhong Tian, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/359,806

(22) Filed: Mar. 20, 2019

(65) Prior Publication Data

US 2019/0293947 A1    Sep. 26, 2019

(30) Foreign Application Priority Data

Mar. 21, 2018    (CN) .......................... 2018 1 0235462

(51) Int. Cl.
*G02B 27/01* (2006.01)
(52) U.S. Cl.
CPC ..... *G02B 27/0176* (2013.01); *G02B 27/0172* (2013.01)
(58) Field of Classification Search
CPC ....... F16D 3/56; F16H 55/02; G02B 27/0172; G02B 27/0176; G02B 2027/0154
See application file for complete search history.

(56) References Cited

U.S. PATENT DOCUMENTS

| 9,574,652 | B2 | 2/2017 | Hong et al. |
| 2017/0205821 | A1 | 7/2017 | Peng et al. |
| 2017/0225887 | A1* | 8/2017 | Fang ...................... B65D 90/00 |

FOREIGN PATENT DOCUMENTS

| CN | 103303095 A | 9/2013 |
| CN | 203425107 U | 2/2014 |

(Continued)

OTHER PUBLICATIONS

First Office Action issued in corresponding Chinese Patent Application No. 201810235462.X, dated Jun. 12, 2019, with English translation.

*Primary Examiner* — Stacy Khoo
(74) *Attorney, Agent, or Firm* — McDermott Will & Emery LLP

(57) ABSTRACT

A rotating mechanism includes a stationary component and a rotating component rotatablely connected to the stationary component. One of the stationary component and the rotating component is provided with at least one group of clamping grooves each including a plurality of clamping grooves that are consecutively arranged in a rotation direction of the rotating component. The rotating mechanism further includes at least one elastic clamping block, which is in one-to-one correspondence with the at least one group of clamping grooves, disposed on another one of the stationary component and the rotating component. Each elastic clamping block is configured to be capable of being matched with any clamping groove of a plurality of clamping grooves included in a corresponding group of clamping grooves, and to be capable of being elastically deformed in a direction away from the clamping groove under a squeezing action of an inner surface of the clamping groove.

12 Claims, 4 Drawing Sheets

(56) References Cited

FOREIGN PATENT DOCUMENTS

| | | | |
|---|---|---|---|
| CN | 203871593 U | 10/2014 | |
| CN | 104965382 A | 10/2015 | |
| CN | 104969321 A | 10/2015 | |
| CN | 206339784 U | 7/2017 | |
| CN | 108563021 A | 9/2018 | |
| DE | 102013216088 A1 | 2/2015 | |
| DE | 102014201517 A1 | 7/2015 | |
| EP | 1795990 A1 | 6/2007 | |
| JP | 2003-166623 A | 6/2003 | |

\* cited by examiner

ROTATING MECHANISM AND HEAD-MOUNTED DISPLAY APPARATUS

CROSS-REFERENCE TO RELATED APPLICATION

This application claims priority to Chinese Patent Application No. 201810235462.X, filed with the Chinese Patent Office on Mar. 21, 2018, titled "ROTATING MECHANISM AND METHOD OF USING THE SAME, AND HEAD-MOUNTED DISPLAY APPARATUS", which is incorporated herein by reference in its entirety.

TECHNICAL FIELD

The present disclosure relates to the field of display technologies, and in particular, to a rotating mechanism and a head-mounted display apparatus.

BACKGROUND

A rotation is one of the basic forms of motion, and a rotating mechanism is usually provided at an input end of a motion mechanism, such as a motion mechanism in a head-mounted display apparatus.

SUMMARY

In an aspect, a rotating mechanism is provided. The rotating mechanism includes a stationary component and a rotating component rotatably connected to the stationary component. One of the stationary component and the rotating component is provided with at least one group of clamping grooves, and each group of the at least one group of clamping grooves includes a plurality of clamping grooves that are consecutively arranged in a rotation direction of the rotating component. The rotating mechanism further includes at least one elastic clamping block disposed on another one of the stationary component and the rotating component, and the at least one elastic clamping block is in one-to-one correspondence with the at least one group of clamping grooves. Each elastic clamping block is configured to be capable of being matched with any clamping groove of a plurality of clamping grooves included in a corresponding group of clamping grooves, and to be capable of being elastically deformed in a direction away from the clamping groove under a squeezing action of an inner surface of the clamping groove, so as to slide out of the clamping groove.

In some embodiments, each elastic clamping block includes an elastic arm and a clamping block body secured to the elastic arm. One end of the elastic arm is secured to the stationary component or the rotating component, and another end of the elastic arm is a free end. The clamping block body is configured to be capable of being engaged with any clamping groove of a plurality of clamping grooves included in a corresponding group of clamping grooves. The elastic arm is configured to be capable of being elastically deformed in a direction away from the clamping groove, so as to drive the clamping block body to slide out of the clamping groove.

In some embodiments, the at least one elastic clamping block includes two elastic clamping blocks, and the two elastic clamping blocks are symmetrically distributed relative to a rotation axis of the rotating component. The at least one group of clamping grooves includes two groups of clamping grooves. The two groups of clamping grooves are in one-to-one correspondence with the two elastic clamping blocks.

In some embodiments, the rotating mechanism further includes a stopper disposed on the stationary component, and a counter-stopper disposed on the rotating component. The stopper is located in a motion path of the counter-stopper and is configured to stop the counter-stopper when the rotating component drives the counter-stopper to rotate, thereby limiting the rotation of the rotating component between a first extreme position and a second extreme position. The first extreme position and the second extreme position are positions corresponding to two ends of a rotatable angle range of the rotating component, respectively.

In some embodiments, the stopper includes a first stopper and a second stopper, and the counter-stopper includes a first baffle and a second baffle. The first baffle, the second baffle, the second stopper and the first stopper are arranged in sequence in the rotation direction of the rotating component. The first stopper is configured to stop the first baffle when the rotating component drives the first baffle and the second baffle to rotate in a first rotation direction, so that the rotating component does not exceed the first extreme position. The second stopper is configured to stop the second baffle when the rotating component drives the first baffle and the second baffle to rotate in a second rotation direction, so that the rotating component does not exceed the second extreme position. The first rotation direction is one of a clockwise direction and a counterclockwise direction, and the second rotation direction is another one of the clockwise direction and the counterclockwise direction.

In some embodiments, the first stopper and the second stopper are secured to a surface of the stationary component facing the rotating component in an axial direction of the stationary component. An arc groove is formed in the rotating component at positions corresponding to the first block and the second block respectively. A center of the arc groove is located on a rotation axis of the rotating component. The first stopper and the second stopper are slideably fitted into the arc grooves, and the first baffle and the second baffle are secured into the arc grooves.

In some embodiments, the rotating component is provided with a through hole, and an axis of the through hole coincides with the rotation axis of the rotating component. The stationary component includes a first shaft and a second shaft, an axis of the first shaft coincides with an axis of the second shaft, and the first shaft and the second shaft are detachably connected in the axial directions of both. The stationary component further includes a flange disposed on an end of the first shaft away from the second shaft, and an annular position-limiting groove surrounding axes of the first shaft and the second shaft is defined between the flange and an end face of an end of the second shaft adjacent to the first shaft. The first shaft is fitted into the through hole of the rotating component, so as to restrict an edge of the rotating component adjacent to the through hole to the position-limiting groove.

In some embodiments, the end of the first shaft adjacent to the second shaft is provided with an orientation groove. The stationary component further includes an orientation rib disposed on the second shaft, and the orientation rib is configured to be capable of being mated with the orientation groove.

In some embodiments, the end of the first shaft adjacent to the second shaft has a cylindrical structure, the end of the second shaft adjacent to the first shaft is provided with an annular groove, and a wall of the cylindrical structure is fitted into the annular groove. The orientation groove is formed in the wall of the cylindrical structure, and the orientation rib is disposed in the annular groove.

In some embodiments, a main body of the rotating component is a rotating wheel. The rotating wheel includes a part of a gear and a part of a thumb wheel, and the part of the gear is in a same plane as the part of the thumb wheel. The part of the gear and the part of the thumb wheel are combined.

In some embodiments, a material of the part of the gear is a PC material and a material of the part of the thumb wheel is a TPU material.

In some embodiments, the plurality of clamping grooves are uniformly arranged in the rotation direction of the rotating component, and an angle of the rotating component rotated when one of the at least one elastic clamping block is changed between each adjacent two clamping grooves of the plurality of clamping grooves is equal.

In another aspect, a head-mounted display apparatus is provided. The head mounted display apparatus includes an adjusting device, and the adjusting device is configured to adjust at least one of a pupil distance and a diopter. The adjusting device includes at least one rotating mechanism according to the above aspect.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

Figure 1:
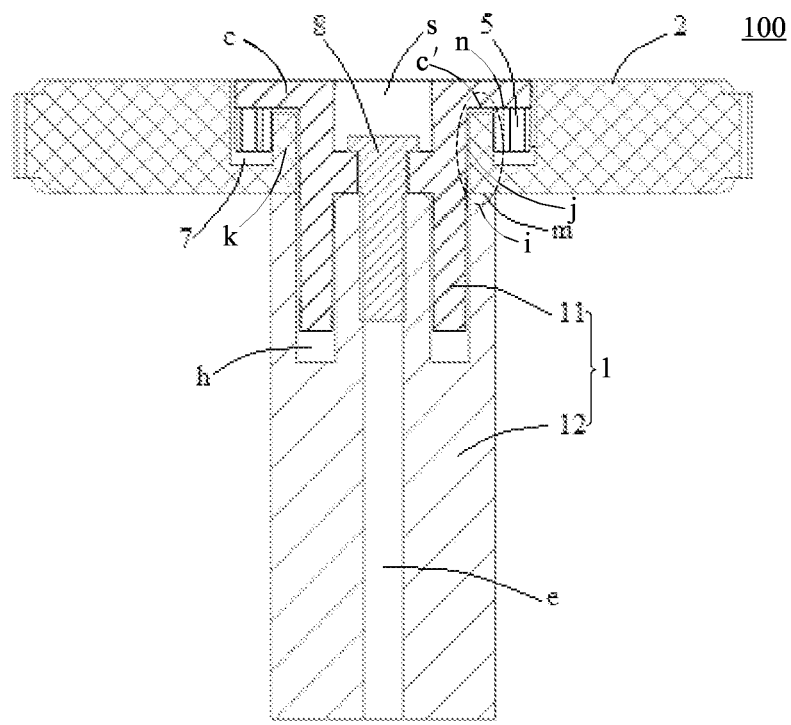
FIG. 1 is a sectional view of a rotating mechanism in accordance with some embodiments of the present disclosure.

Some embodiments of the present disclosure will be described below in conjunction with the accompanying drawings. Obviously, the described embodiments are merely some but not all of embodiments of the present disclosure. All other embodiments made on the basis of the embodiments of the present disclosure by a person of ordinary skill in the art shall be included in the protection scope of the present disclosure.

In the description of embodiments of the present disclosure, it will be understood that orientations or positional relationships indicated by terms "upper", "lower", "front", "top", "bottom", "inner", "outer", etc. are based on orientations or positional relationships shown in the drawings, merely to facilitate and simplify the description of the embodiments of the present disclosure, but not to indicate or imply that the referred devices or elements must have a particular orientation, or must be constructed or operated in a particular orientation. Therefore, they should not be construed as limitations to the present disclosure.

The terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of embodiments of the present disclosure, "plurality" means two or more unless otherwise specified.

In the description of embodiments of the present invention, it will be noted that the terms "mounted", "connected", and "connection" should be understood in a broad sense unless specifically defined or limited. For example, it may be a permanent connection, a detachable connection, or it may be an integrated connection; and it may be directly connected, indirectly connected through an intermediate medium, or it may be an internal connection between two components. For a person of ordinary skill in the art, the specific meanings of the above terms in the present disclosure can be understood according to specific circumstances.

In the related art, a rotating mechanism provided at an input end of a motion mechanism includes a stationary component and a rotating component rotatablely connected to the stationary component, and the rotating component may rotate relative to the stationary component by turning the rotating component by human hands. However, a rotation angle of the rotating component can not be feed back to an operator from the rotating component during the rotation of the rotating component. In order to achieve the feedback of the rotation angle, an expansion mechanism is required to be provided, which results in difficulty in designing and assembling the rotating mechanism fitted with the expansion mechanism.

With reference to FIGS. 1-7, some embodiments of the present disclosure provide a rotating mechanism 100. The rotating mechanism 100 includes a stationary component 1 and a rotating component 2, and the rotating component 2 is rotatablely connected to the stationary component 1.

One of the stationary component 1 and the rotating component 2 is provided with at least one group of clamping grooves 3, and each group of clamping grooves 3 includes a plurality of clamping grooves 3 that are consecutively arranged in a rotation direction of the rotating component 2.

The rotating mechanism 100 further includes at least one elastic clamping block 4 disposed on another one of the stationary component 1 and the rotating component 2, and each elastic clamping block 4 is configured to be matched with any one of the plurality of clamping grooves 3 included in a corresponding group of clamping grooves 3.

In some embodiments, the at least one group of clamping grooves 3 is formed in the rotating component 2, and the at least one elastic clamping block 4 is disposed on the stationary component 1, as shown in FIGS. 1-7. In some other embodiments, the at least one group of clamping grooves are formed in the stationary component 1, and the at least one elastic clamping block 4 is disposed on the rotating component 2.

It will be noted that the "rotation direction of the rotating component 2" described above refers to a direction in which the rotating component 2 rotates relative to the stationary component 1. In some examples, the direction is a counter-clockwise direction (the direction x shown in FIG. 6). Alternatively, the direction is a clockwise direction (the direction y as shown in FIG. 7).

Figure 2:
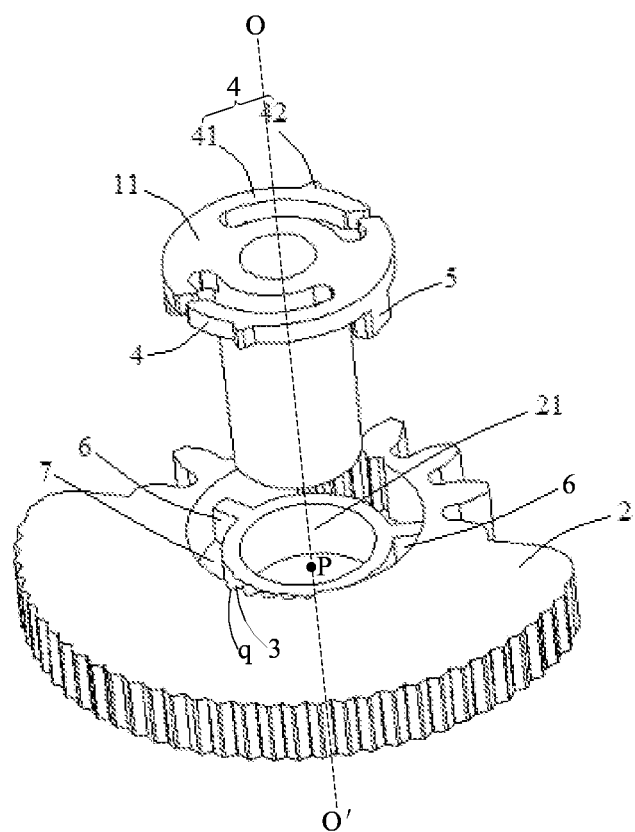
FIG. 2 is an exploded view of an assembly of a rotating component and a first shaft of a stationary component in a rotating mechanism in accordance with some embodiments of the present disclosure.
Figure 3:
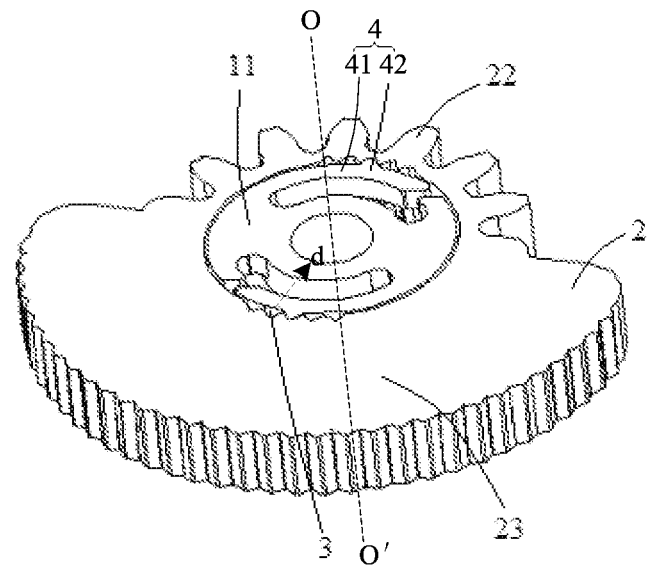
FIG. 3 is a schematic diagram showing a structure obtained after an assembly of a rotating component and a first shaft of a stationary component in a rotating mechanism in accordance with some embodiments of the present disclosure.

As shown in FIGS. 2 and 3, each elastic clamping block 4 is matched with a corresponding clamping groove 3, and when the rotating component 2 rotates relative to the stationary component 1, the elastic clamping block 4 will be squeezed by an inner surface q of the clamping groove 3. Then the elastic clamping block 4 will be elastically deformed in a direction d away from the clamping groove 3 under the squeezing action of the inner surface q of the clamping groove 3, so as to slide out of the clamping groove 3.

Since the plurality of clamping grooves 3 included in each group of clamping grooves 3 are consecutively arranged in the rotation direction of the rotating component 2, when an elastic clamping block 4 slides out of the matched clamping groove 3, the elastic clamping block 4 may meet a next clamping groove 3 (that is, a clamping groove 3 adjacent to the matched clamping groove 3 in a direction opposite to the rotation direction of the rotating component 2) with the rotation of the rotating component 2. In this case, the elastic clamping block 4 is stuck into the next clamping groove 3 under an action of an elastic restoring force and a feedback signal (such as vibration, sound, etc.) is generated. Therefore, an operator can know a rotation angle of the rotating component 2 according to the number of feedback signals (that is, quantifying the rotation angle of the rotating component 2), thereby eliminating a need to provide an expansion mechanism for the rotating mechanism to achieve a function of feeding back the rotation angle, further reducing a design difficulty and an assembly difficulty of the rotating mechanism having the function of feeding back the rotation angle, and reducing a cost.

Figure 6:
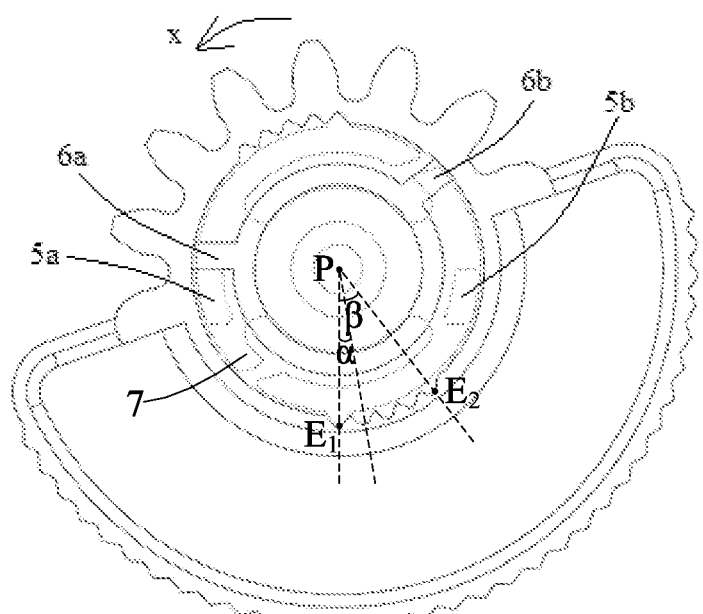
FIG. 6 is a schematic diagram of a rotating component of a rotating mechanism in a first extreme position in accordance with some embodiments of the present disclosure.
Figure 7:
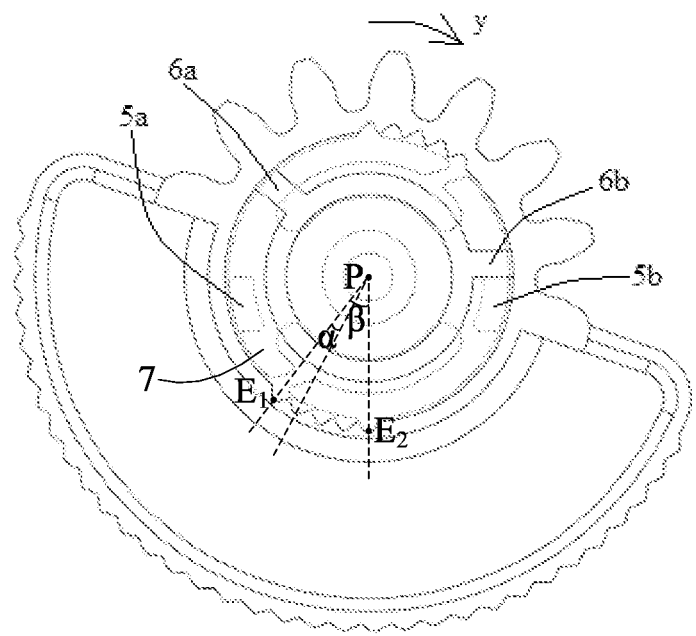
FIG. 7 is a schematic diagram of a rotating component of a rotating mechanism in a second extreme position in accordance with some embodiments of the present disclosure.

With reference to FIGS. 6 and 7, in some embodiments, one-stage adjustment is completed after an elastic clamping block 4 of the rotating mechanism 100 slides out of one clamping groove 3 and is stuck into a next clamping groove 3. The angle adjusted is equal to a central angle $\alpha$ corresponding to a distance between bottoms of the adjacent two clamping grooves 3. When there is no external force, an elastic clamping block 4 is stuck into a corresponding clamping groove 3 to lock relative positions of the rotating component 2 and the stationary component 1, thereby preventing a deflection or displacement of the rotating component 2.

In some embodiments, the plurality of clamping grooves 3 included in each group of clamping grooves 3 are uniformly arranged in the rotation direction of the rotating component 2. When the position of each elastic clamping block 4 is changed between each adjacent two clamping grooves 3 of the plurality of clamping grooves 3 included in a corresponding group of clamping grooves 3, the rotation angle (that is, the angle $\alpha$) of the rotating component 2 is equal. That is, during the rotation of the rotating component 2 relative to the stationary component 1 to achieve a stepwise adjustment, the angle adjusted in each stage is equal, and thus the number of the stages required to be adjusted may be accurately calculated by dividing the angle required to be adjusted by the angle adjusted in each stage, and the number of the feedback signals required to be obtained is known. Then the adjustment as needed is performed according to the number of the feedback signals obtained through the calculation, thereby improving an accuracy of adjusting the rotation angle.

In the rotating mechanism 100 provided by some embodiments, each elastic clamping block 4 can be implemented in many structural forms.

In some embodiments, each elastic clamping block 4 includes a spring and a clamping block body. One end of the spring is secured to the stationary component 1 or the rotating component 2, and the clamping block body is secured to another end of the spring. The clamping block body is configured to be capable of being matched with any one of the plurality of clamping grooves 3 included in a corresponding group of clamping grooves 3. The spring is configured to be capable of contracting in a direction away from the clamping groove 3 matched with the clamping block body, so that the clamping block body slides out of the clamping groove 3.

Figure 4:
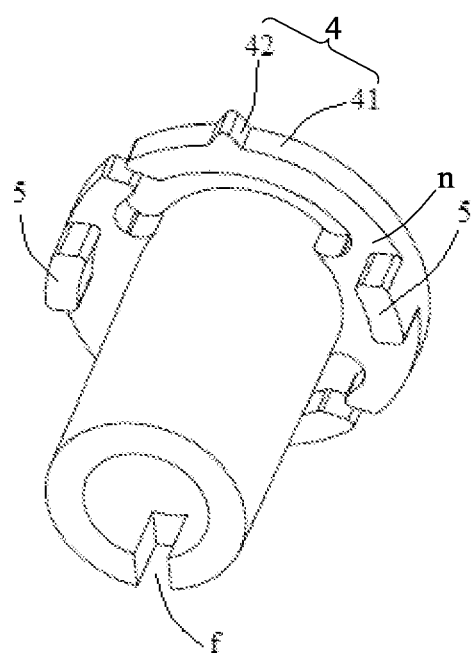
FIG. 4 is a schematic diagram of a first shaft of a stationary component in a rotating mechanism in accordance with some embodiments of the present disclosure.

In some other embodiments, as shown in FIGS. 3 and 4, each of the at least one elastic clamping block 4 includes an elastic arm 41 and a clamping block body 42. One end of the elastic arm 41 is secured to the stationary component 1 or the rotating component 2, and another end is a free end and is in a free state, that is, a suspended state, forming a cantilever beam structure. The clamping block body 42 is secured to the elastic arm 41, and the clamping block body 42 is configured to be capable of being matched with any one of the plurality of clamping grooves 3 included in a corresponding group of clamping grooves 3. The elastic arm 41 is elastically deformable in a direction d away from the matched clamping groove 3, so that the clamping block body 42 can slide out of the matched clamping groove 3. The elastic clamping block 4 adopts the design of the elastic arm 41 and the block clamping body 42 to improve a structural stability of the elastic clamping block 4.

In some embodiments, with reference to FIGS. 2, 3, 6, and 7 again, the at least one elastic clamping block 4 includes two elastic clamping blocks 4, and the two elastic clamping blocks 4 are symmetrically distributed relative to a rotation axis OO' of the rotating component 2. The at least one group of clamping grooves 3 includes two groups of clamping grooves 3, and the two groups of clamping grooves 3 are in one-to-one correspondence with the two elastic clamping blocks 4 described above. That is, the two groups of clamping grooves 3 are also symmetrically distributed relative to the rotation axis OO' of the rotating component 2. In this way, the stability of a process of adjusting the rotation angle by the rotating component 2 in the rotating mechanism 100 may be improved.

In some other embodiments, the rotating mechanism 100 includes three elastic clamping blocks 4 and three groups of clamping grooves 3 that are in one-to-one correspondence, or the rotating mechanism 100 includes four elastic clamping blocks 4 and four groups of clamping grooves 3 that are in one-to-one correspondence, etc. The number of the elastic clamping blocks 4 and the corresponding number of the groups of the clamping grooves 3 can be designed according to actual needs.

In order to achieve a limitation of a rotatable angle range of the rotating component 2 in the rotating mechanism 100, in some embodiments, as shown in FIGS. 1, 2, 4, 6, and 7, the rotating mechanism 100 further includes a stopper 5 disposed on the stationary component 1 and a counter-stopper 6 disposed on the rotating component 2. The stopper 5 is located in a motion path of the counter-stopper 6 to stop the counter-stopper 6 when the rotating component 2 drives the counter-stopper 6 to rotate, thereby limiting the rotation of the rotating component 2 between a first extreme position E1 and a second extreme position E2. Thereby, a setting of the two extreme positions of the rotatable angle range of the rotating component 2 is able to be achieved. Therefore, there is no need to use an expansion mechanism to achieve the function of setting the extreme positions of the rotation, so that the rotating mechanism 100 may achieve the function of feeding back the rotation angle and the function of setting the extreme positions of the rotation without providing the expansion mechanism, thereby reducing the complexity of achieving the rotating mechanism 100 having the two functions described above, further reducing the difficulty of designing and assembling the rotating mechanism 100, and reducing the cost.

It will be noted that, as shown in FIGS. 6 and 7, the "first extreme position E1" and "second extreme position E2" described above are the positions of both ends of the rotatable angle range β of the rotating component 2, respectively. In some embodiments, the rotatable angle range β of the rotating component 2 is a central angle corresponding to the distance between bottoms of two clamping grooves 3 respectively at both outermost ends of the plurality of clamping grooves 3 included in a group of clamping grooves 3. The first extreme position E1 and the second extreme position E2 are the positions where the bottoms of the two clamping grooves 3 respectively at the both outermost ends of the plurality of clamping grooves 3 included in a group of clamping grooves 3 are located, respectively.

In the rotating mechanism 100 provided by some embodiments of the present disclosure, the stopper 5 and the counter-stopper 6 may be achieved in many manners.

In some embodiment, the stopper 5 includes a stopper and the counter-stopper 6 includes two baffles. The stopper is configured to stop the two baffles when the rotating component 2 drives the two baffles to rotate around the rotation axis of the rotating component 2, so that the rotating component 2 rotates between the first extreme position E1 and the second extreme position E2.

In some other embodiments, the stopper 5 includes two stoppers and the counter-stopper 6 includes one baffle. The two stoppers are configured to limit the position of the baffle when the rotating component 2 drives the baffle to rotate around the rotation axis of the rotating component 2 in the first rotation direction and the second rotation direction, so that the rotating component 2 rotates between the first extreme position E1 and the second extreme position E2.

In some other embodiments, with reference to FIGS. 6 and 7, the stopper 5 includes two stoppers, i.e., a first stopper 5a and a second stopper 5b, and the counter-stopper 6 includes two baffles, i.e., a first baffle 6a and a second baffle 6b. The first stopper 5a, the second stopper 5b, the first baffle 6a and the second baffle 6b are arranged in the rotation direction of the rotating component 2, and the first stopper 5a is adjacent to the second stopper 5b. That is, the first baffle 6a, the second baffle 6b, the second stopper 5b and the first stopper 5a are arranged in sequence in the rotation direction of the rotating component 2.

With reference to FIG. 6, the first stopper 5a is configured to stop the first baffle 6a when the rotating component 2 drives the first baffle 6a and the second baffle 6b to rotate in a first rotation direction x, so that the rotating component 2 does not exceed the first extreme position E1.

With reference to FIG. 7, the second stopper 5b is configured to stop the second baffle 6b when the rotating component 2 drives the first baffle 6a and the second baffle 6b to rotate in a second rotation direction y, so that the rotating component 2 does not exceed the second extreme position E2.

It will be noted that the "first rotation direction x" described above is one of a clockwise direction and a counterclockwise direction, and the "second rotation direction y" is another one of the clockwise direction and the counterclockwise direction. In some examples, with reference to FIGS. 6 and 7 again, the first rotation direction x is the counterclockwise direction and the second rotation direction y is the clockwise direction. In some other examples, the first rotation direction x is the clockwise direction and the second rotation direction y is the counterclockwise direction.

In this way, the rotating component 2 rotates between the first extreme position E1 and the second extreme position E2, and the rotatable angle range of the rotating component 2 is the central angle β corresponding to a line between the first extreme position E1 and the second extreme position E2. In the structural design described above, the structures of the first stopper 5a, the second stopper 5b, the first baffle 6a and the second baffle 6b are simple and save materials, which may reduce the production cost of the rotating mechanism 100.

In some embodiments, with reference to FIGS. 1, 2, 4, 6, and 7, the first stopper 5a and the second stopper 5b are secured to a surface n of the stationary component 1 facing the rotating component 2 in an raxial direction of the stationary component 1. An arc groove 7 is formed in a surface of the rotating component 2 facing the stationary component 1 (i.e., an upper surface of the rotating component 2 shown in FIG. 2) at positions corresponding to the first stopper 5a and the second stopper 5b, and a center P of the arc groove 7 is located on the rotation axis OO' of the rotating component 2. The first stopper 5a and the second stopper 5b are slideably fitted into the arc groove 7, and the first baffle 6a and the second baffle 6b are secured into the arc groove 7, so that the rotating component 2 and the stationary component 1 cooperate more closely, thereby making the overall structure of the rotating mechanism 100 more compact.

In some embodiments, with reference to FIGS. 1 and 2, the rotating component 2 is provided with a through hole 21, and an axis of the through hole 21 coincides with the rotation axis OO' of the rotating component 2. The stationary component 1 includes a first shaft 11 and a second shaft 12, an axis of the first shaft 11 coincides with an axis of the second shaft 12, and the first shaft 11 and the second shaft 12 are detachably connected in the axial directions of both. The stationary component 1 further includes a flange c disposed on an end of the first shaft 11 away from the second shaft 12, and an annular position-limiting groove i surrounding the axes of the first shaft 11 and the second shaft 12 is defined between the flange c and an end face m of an end of the second shaft 12 adjacent to the first shaft 11. That is, the position-limiting groove i is bounded by a surface c' of the flange c facing the second shaft 12, the end face m of the end of the second shaft 12 adjacent to the first shaft 11, and a peripheral surface j of the first shaft 11 between the surface c' and the end face m.

The first shaft 11 is fitted into the through hole 21 of the rotating component 2, so that an edge k of the rotating component 2 adjacent to the through hole 21 is restricted in the position-limiting groove i. In this case, the flange c may stop the rotating component 2 from sliding out of the end of the first shaft 11 away from the second shaft 12, and the end face m of the second shaft 12 adjacent to the first shaft 11 may stop the rotating component 2 from sliding out of the end of the first shaft 11 adjacent to the second shaft 12. Thereby, the rotating component 2 may be limited between the flange c and the second shaft 12. The rotating component 2 can be assembled to or disassembled from the stationary component 1 by disassembling the first shaft 11 and the second shaft 12, thereby facilitating the disassembly and assembly of the rotating component 2.

In some embodiments, the first shaft 11 is in clearance fit with the through hole 21, so that the rotating component 2 may rotate relative to the first shaft 11.

In some embodiments, as shown in FIGS. 1 and 4, the first stopper 5a and the second stopper 5b are secured to the surface n of the first shaft 11 of the stationary component 1 facing the rotating component 2 in the axial direction of the stationary component 1. In some examples, the surface c' of the flange c of the first shaft 11 facing the second shaft 12 and the surface n of the first shaft 11 facing the rotating component 2 in the axial direction of the stationary component 1 are in the same plane.

In some embodiments, as shown in FIG. 1, the stationary component 1 further includes a screw 8 connected the first shaft 11 with the second shaft 12. In some embodiments, the first shaft 11 is provided with an unthreaded hole s, and the second shaft 12 is provided with a threaded hole e. The screw 8 is connected to the threaded hole e through the unthreaded hole s. The unthreaded hole s is, for example, a counterbore, so that a screw head of the screw 8 can sink into the first shaft 11. The embodiments of the present disclosure do not limit a depth of the threaded hole e and whether the threaded hole e is a through hole.

Figure 5:
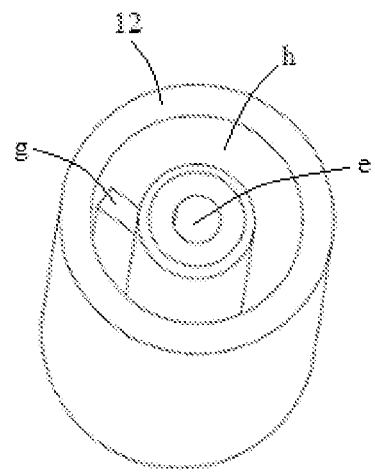
FIG. 5 is a schematic diagram of a second shaft of a stationary component in a rotating mechanism in accordance with some embodiments of the present disclosure.

In some embodiments, as shown in FIGS. 4 and 5, the end of the first shaft 11 adjacent to the second shaft 12 is provided with an orientation groove f, and the stationary component 1 further includes an orientation rib g disposed on the second shaft 12. The orientation rib g is mated with the orientation groove f to stop the relative rotation of the first shaft 11 and the second shaft 12, thereby making the coupling between the first shaft 11 and the second shaft 12 more stable.

With reference to FIGS. 4 and 5 again, in some examples, the end of the first shaft 11 adjacent to the second shaft 12 has a cylindrical structure, the end of the second shaft 12 adjacent to the first shaft 11 is provided with an annular groove h, and a wall of the cylindrical structure is fitted into the annular groove h. The orientation groove f is formed in the wall of the cylindrical structure, and the orientation rib g is disposed in the annular groove h. In this way, when the wall of the cylindrical structure of the first shaft 11 is fitted into the annular groove h of the second shaft 12, the orientation rib g is inserted into the orientation groove f. Thereby, the coupling between the first shaft 11 and the second shaft 12 becomes more stable through a mutual engagement between the wall of the cylindrical structure and the annular groove h and the mutual engagement between the orientation rib g and the orientation groove f.

With reference to FIG. 1 again, in some embodiments, the portion m of the second shaft 12 for stopping the rotating component 2 from sliding out of the end of the first shaft 11 adjacent to the second shaft 12 is in the same plane as the threaded hole e, and the orientation rib g is disposed in the annular groove h.

In some embodiments, with reference to FIG. 3, a main body of the rotating component 2 is a rotating wheel. The rotating wheel includes a part of a gear 22 and a part of a thumb wheel 23, the part of the gear 22 is in a same plane as the part of the thumb wheel 23, and both are combined. In some examples, the rotating wheel is composed of one half of the gear 22 and one half of the thumb wheel 23, both of which are in the same layer, that is, both are in the same plane. The gear 22 may be driven to rotate by turning the thumb wheel 23. This design not only has a simple processing, but also eliminates the need to provide multi-layer of gears and thumb wheels, thereby saving space and reducing the difficulty of assisting a positioning of the rotating mechanism.

In some examples, the rotating component 2 further includes fold-line type protrusions or wavy-line type protrusions disposed on an outer contour of the thumb wheel 23 (i.e., an outer wall surface parallel to the rotation axis OO'), thereby providing a greater friction when the thumb wheel 23 is turned, and improving a convenience of operation.

In some embodiments, a material of the gear 22 is a polycarbonate (PC) material, and a material of the thumb wheel 23 is a thermoplastic polyurethanes (TPU) material. The part of the gear 22 and the part of the thumb wheel 23 can be formed by a two-color injection molding process. Of course, the part of the gear 22 and the part of the thumb wheel 23 can also be integrally formed, which is not limited herein.

In some embodiments, as shown in FIGS. 1-7, in the rotating mechanism 100, the at least one group of clamping grooves 3 is formed in the rotating component 2, and the at least one elastic clamping block 4 is disposed on the first shaft 11 of the stationary component 1. The at least one elastic clamping block 4 includes two elastic clamping blocks 4, and the two elastic clamping blocks 4 are symmetrically distributed relative to the axis of the first shaft 11. The at least one group of the clamping grooves 3 includes two groups of the clamping grooves 3, and the two groups of the clamping grooves 3 are in one-to-one correspondence with the two elastic clamping blocks 4. In this way, when there is no external force, the relative positions of the rotating component 2 and the stationary component 1 may be locked more stably. The first baffle 6a and the second baffle 6b are disposed at a side where one half of the gear 22 is located, and the first stopper 5a and the second stopper 5b are disposed on the first shaft 11.

When assembling, the first shaft 11 is first inserted into the through hole 21 in the center of the rotating component 2, and then the cylindrical structure of the first shaft 11 is mounted into the annular groove h of the second shaft 12. Moreover, the orientation groove f is mated with the orientation rib g, and finally the screw 8 is inserted through the unthreaded hole s of the first shaft 11 and is mated with the threaded hole e of the second shaft 12 to complete the assembly.

Some embodiments of the present disclosure provide a method of using the rotating mechanism 100 described above, and the method includes the following steps.

The rotating component 2 is driven to rotate in the first rotation direction x or the second rotation direction y, so that each elastic clamping block 4 in the rotating mechanism 100 is elastically deformed in the direction away from the matched clamping groove 3 under the squeezing action of the inner surface of the matched clamping groove 3 until the elastic clamping block slides out of the matched clamping groove 3. Then the rotating component 2 is driven to continue to rotate in the same direction, so that each elastic clamping block 4 is stuck into a next clamping groove adjacent to the matched clamping groove 3 and a feedback signal is generated. The feedback signal is not limited to any one or several of vibration, sound, light, etc.

In turn, the steps described above are repeated until the number of feedback signals reaches an expected value.

Therefore, when the rotating component 2 is required to rotate at a certain angle (a target angle), the operator can calculate the required number of the feedback signals received when the rotating component 2 rotates at the target angle according to the central angle α corresponding to the distance between the bottoms of the adjacent two clamping grooves 3 (i.e., the angle adjusted in one stage). That is, the expected value described above is known. Then, the rotating component 2 is driven to rotate, and the feedback signals are received during the driving process to determine whether the number of the feedback signals actually received reaches the expected value. If not, the steps described above will be repeated until the expected value is reached. In this way, the rotating component 2 may rotate at the target angle and the adjustment as needed may be achieved.

Figure 8:
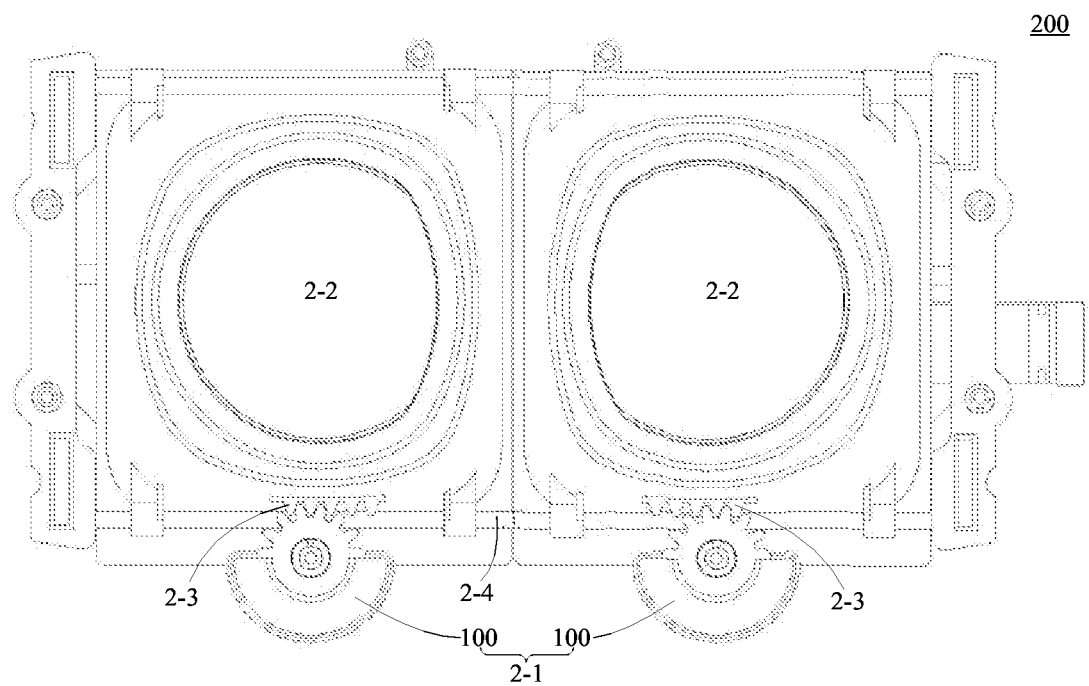
FIG. 8 is a cross-section diagram of a head-mounted display apparatus in accordance with some embodiments of the present disclosure.

Some embodiments of the present disclosure provide a head-mounted display apparatus. As shown in FIG. 8, the head-mounted display apparatus 200 includes an adjusting device 2-1, and the adjusting device 2-1 is configured to adjust at least one of a pupil distance and a diopter of the head-mounted display apparatus 200. The adjusting device 2-1 includes at least one rotating mechanism 100 described in the above embodiments. The head-mounted display apparatus is, for example, a virtual reality (VR) apparatus or an augmented reality (AR) apparatus.

In the head-mounted display apparatus 200 described above, the rotating mechanism 100 includes a stationary component 1 and a rotating component 2 rotatablely connected to the stationary component 1. One of the stationary component 1 and the rotating component 2 is provided with at least one group of clamping grooves 3, and each group of clamping grooves 3 includes a plurality of clamping grooves 3 that are consecutively arranged in the rotation direction of the rotating component. The rotating mechanism 100 further includes at least one elastic clamping block 4 disposed on another one of the stationary component 1 and the rotating component 2 and the at least one elastic clamping block 4 are in one-to-one correspondence with the at least one group of clamping grooves 3. Each elastic clamping block 4 is configured to be capable of being elastically deformed in the direction away from the matched clamping groove 3 under the squeezing action of the inner surface of the matched clamping groove 3, so as to slide out of the matched clamping groove 3, thereby allowing the rotating component 2 to rotate relative to the stationary component 1. Each elastic clamping block 4 may meet a next clamping groove 3 with the rotation of the rotating component 2. In this case, each elastic clamping block 4 is stuck into the next clamping groove 3 under the action of the elastic restoring force and a feedback signal (such as vibration, sound, etc.) is generated. Therefore, the operator can know the rotation angle of the rotating component 2 according to the number of feedback signals (that is, quantifying the rotation angle of the rotating component 2), thereby eliminating the need to provide the expansion mechanism to achieve the function of feeding back the rotation angle, further reducing the complexity of achieving the rotating mechanism having the function of feeding back the rotation angle, and reducing the design difficulty and assembly difficulty of achieving the rotating mechanism having the function of feeding back the rotation angle, and reducing the cost.

In some embodiments, with reference to FIG. 8 again, taking an example in which the adjusting device 2-1 of the head-mounted display apparatus 200 is configured to adjust the pupil distance, the head-mounted display apparatus 200 includes an adjusting device 2-1, and the adjusting device 2-1 includes two rotating mechanisms 100. The head-mounted display apparatus 200 further includes two lens barrels 2-2 arranged side by side, two racks 2-3 engaged with two rotating mechanisms 100 respectively, and a guide shaft 2-4. When the pupil distance is adjusted, the two rotating mechanisms 100 are turned so that the two racks 2-3 meshing with the two rotating mechanisms 100 are away from each other or close to each other, thereby driving the two lens barrels 2-2 away from or close to each other along the guide shaft 2-4, and achieving the adjustment of the pupil distance.

The head-mounted display apparatus in the embodiments of the present disclosure further includes other components, which will not be described in detail herein.

The foregoing descriptions are merely some implementation manners of the present disclosure, but the protection scope of the present disclosure is not limited thereto, and the protection scope of the present disclosure shall be subject to the protection scope of the claims.

What is claimed is:

1. A rotating mechanism, comprising:
   a stationary component;
   a rotating component rotatably connected to the stationary component, wherein one of the stationary component and the rotating component is provided with at least one group of clamping grooves, and each group of clamping grooves includes a plurality of clamping grooves that are consecutively arranged in a rotation direction of the rotating component;
   a stopper disposed on the stationary component, and a counter-stopper disposed on the rotating component, wherein, the stopper is located in a motion path of the counter-stopper, and is configured to stop the counter-stopper when the rotating component drives the counter-stopper to rotate, thereby limiting a rotation of the rotating component between a first extreme position and a second extreme position; and the first extreme position and the second extreme position are positions corresponding to two ends of a rotatable angle range of the rotating component, respectively; and
   at least one elastic clamping block disposed on another one of the stationary component and the rotating component, the at least one elastic clamping block being in one-to-one correspondence with the at least one group of clamping grooves, wherein
   each elastic clamping block is configured to be capable of being matched with any clamping groove of a plurality of clamping grooves included in a corresponding group of clamping grooves, and to be capable of being elastically deformed in a direction away from the clamping groove under a squeezing action of an inner surface of the clamping groove, so as to slide out of the clamping groove.

2. The rotating mechanism according to claim 1, wherein each elastic clamping block includes an elastic arm and a clamping block body secured to the elastic arm;
   one end of the elastic arm is secured to the stationary component or the rotating component, and another end of the elastic arm is a free end;
   the clamping block body is configured to be capable of being matched with any clamping groove of a plurality of clamping grooves included in a corresponding group of clamping grooves; and the elastic arm is configured to be capable of being elastically deformed in a direction away from the clamping groove, so as to drive the clamping block body to slide out of the clamping groove.

3. The rotating mechanism according to claim 1, wherein the at least one elastic clamping block includes two elastic clamping blocks that are symmetrically distributed relative to a rotation axis of the rotating component; and the at least one group of clamping grooves includes two groups of clamping grooves in one-to-one correspondence with the two elastic clamping blocks.

4. The rotating mechanism according to claim 1, wherein the stopper includes a first stopper and a second stopper, the counter-stopper includes a first baffle and a second baffle, and the first baffle, the second baffle, the second stopper and the first stopper are arranged in sequence in the rotation direction of the rotating component;

the first stopper is configured to stop the first baffle when the rotating component drives the first baffle and the second baffle to rotate in a first rotation direction, so that the rotating component does not exceed the first extreme position;

the second stopper is configured to stop the second baffle when the rotating component drives the first baffle and the second baffle to rotate in a second rotation direction, so that the rotating component does not exceed the second extreme position; and the first rotation direction is one of a clockwise direction and a counterclockwise direction, and the second rotation direction is another one of the clockwise direction and the counterclockwise direction.

5. The rotating mechanism according to claim 4, wherein the first stopper and the second stopper are secured to a surface of the stationary component facing the rotating component in an axial direction of the stationary component, an arc groove is formed in the rotating component at positions corresponding to the first block and the second block respectively, a center of the arc groove is located on a rotation axis of the rotating component, the first stopper and the second stopper are slidably fitted into the arc groove, and the first baffle and the second baffle are secured into the arc groove.

6. The rotating mechanism according to claim 1, wherein the rotating component is provided with a through hole, an axis of the through hole coincides with a rotation axis of the rotating component;

the stationary component includes a first shaft and a second shaft, an axis of the first shaft coincides with an axis of the second shaft, and the first shaft and the second shaft are detachably connected in an axial directions of both;

the stationary component further includes a flange disposed on an end of the first shaft away from the second shaft, and an annular position-limiting groove surrounding axes of the first shaft and the second shaft is defined between the flange and an end face of an end of the second shaft adjacent to the first shaft; and the first shaft is fitted into the through hole of the rotating component, so as to restrict an edge of the rotating component adjacent to the through hole to the position-limiting groove.

7. The rotating mechanism according to claim 6, wherein the end of the first shaft adjacent to the second shaft is provided with an orientation groove, the stationary component further includes an orientation rib disposed on the second shaft, the orientation rib is configured to be capable of being mated with the orientation groove.

8. The rotating mechanism according to claim 7, wherein the end of the first shaft adjacent to the second shaft has a cylindrical structure, the end of the second shaft adjacent to the first shaft is provided with an annular groove, and a wall of the cylindrical structure is fitted into the annular groove; and the orientation groove is formed in the wall of the cylindrical structure, and the orientation rib is disposed in the annular groove.

9. The rotating mechanism according to claim 1, wherein a main body of the rotating component is a rotating wheel, the rotating wheel includes a part of a gear and a part of a thumb wheel, the part of the gear is in a same plane as the part of the thumb wheel, and the part of the gear and the part of the thumb wheel are combined.

10. The rotating mechanism according to claim 9, wherein a material of the part of the gear is a polycarbonate material and a material of the part of the thumb wheel is a thermoplastic polyurethanes material.

11. The rotating mechanism according to claim 1, wherein the plurality of clamping grooves are uniformly arranged in the rotation direction of the rotating component, and the rotating component rotates at a same angle when one of the at least one elastic clamping block is changed between each adjacent two clamping grooves of the plurality of clamping grooves.

12. A head-mounted display apparatus, comprising an adjusting device configured to adjust at least one of a pupil distance and a diopter, wherein the adjusting device includes at least one rotating mechanism according to claim 1.

* * * * *